Feb. 6, 1951 R. CRANE, JR 2,540,935

RECEIVER GAIN CONTROL

Filed Sept. 28, 1948 3 Sheets-Sheet 1

INVENTOR
ROBERT CRANE, JR.
BY
ATTORNEY

Feb. 6, 1951 R. CRANE, JR 2,540,935

RECEIVER GAIN CONTROL

Filed Sept. 28, 1948 3 Sheets-Sheet 2

Inventor

ROBERT CRANE, JR.

By H. L. Mackey

Attorney

Feb. 6, 1951 R. CRANE, JR 2,540,935

RECEIVER GAIN CONTROL

Filed Sept. 28, 1948 3 Sheets-Sheet 3

Inventor
ROBERT CRANE, JR.

By H. L. Mackey
Attorney

Patented Feb. 6, 1951 2,540,935

UNITED STATES PATENT OFFICE 2,540,935

RECEIVER GAIN CONTROL

Robert Crane, Jr., Chappaqua, N. Y., assignor to General Precision Laboratory Incorporated, a corporation of New York Application September 28, 1948, Serial No. 51,552

8 Claims. (Cl. 179—171)

This invention pertains to the control of gain in radio receivers. In particular, it pertains to the prevention of front-end distortion in radio receivers by the use of a special gain control method and means.

This invention has the widest application to all radio receivers in which fidelity of signal reproduction or degree of signal distortion are of any importance. This particularly includes all amplitude modulation radio receivers, and of such receivers particularly those for pulse reception. Such receivers include, in the microwave frequency range, radar receivers; and in the low radio frequency range, long range navigation system receivers commonly known as Loran receivers. This invention also has application to continuous wave receivers such as those used for short and long wave broadcast reception.

In Loran systems two transmitted "A" and "B" pulses are received by Loran receiving equipment, on an air or marine craft from a master and a slave transmitting station, both located on shore. These pulses appear as pips on a cathode ray tube screen in the receiving equipment, the slave station B pip bearing a precise time relation to the master station A pip. By manipulation of controls the two pips are adjusted to coincide on the cathode ray tube screen. This involves certain delay features not important here but the result is that by such manipulation the exact time differential between reception of the A and B pulses is measured, and reference to a Loran chart gives the position of the craft on a line of position corresponding to this time difference. Another similar pair of signals is then received from a different pair of stations and after similar manipulation a second line of position is determined, the point of intersection of the two lines giving the position of the craft carrying the receiving equipment.

What is important in the present development is that the two pips be undistorted in shape by the receiver, or if distorted be distorted alike, so that precise and accurate matching or coincidence of the forward sides of the two pips on the cathode ray tube screen is made possible.

The A and B pulses as received may be widely different in strength, depending on the difference in distances to the master and slave transmitting stations, and the heights of the resulting A and B pips on the screen will be correspondingly different. In fact, provision is made, in the equipment used herein as an example, for comparison of A and B pulses which differ in magnitude by 10,000 to 1, and cover a range measured at the receiving antenna terminals from 1 microvolt to 2 volts.

However, in spite of such disparity in strength, received signals must be so amplified before display on the screen that the observed pips shall be of the same amplitude or height, hence it is required that the gain of the receiver be capable of wide variation and that a gain change be automatically effected between the reception of an A pulse and the subsequent reception of the following B pulse. That is, of course, usual in Loran receivers, but the differential gain control used heretofore to adjust the gain to accommodate the difference in coming signal levels in a pair of signal pulses has inherently been the source of selective distortion, producing distortion in each pulse in accordance with its strength, so that the shape of a pip resulting from a strong pulse was radically different from that of a pip produced by a weak pulse. This obviously reduces the matching of the leading sides of A and B pips in such a case to mere guesswork because of their different shape and introduces a serious error in the final result, the determination of the position of the ship. This error has hitherto been unavoidable in the operation of all Loran receivers. This error may, however, be completely eliminated if the shapes of the A and B pips, after being made alike in height, are exactly the same so that their forward slopes can be superposed with precision and made to coincide exactly. This is accomplished in the present invention. The shapes of the two pips are alike, resulting in a reduction of this error to negligible proportions.

In any radio receiver such as for broadcast amplitude modulation receptions with large input signal level, one cause of distortion originates in the first tube, whether it be a radio frequency amplifier or a mixer, to which signals are fed from the antenna. Such first-tube distortion is minimized only when a small signal is received by the first discharge tube encountered by the received signal. Many methods have been proposed for reducing this distortion but none has been more than quantitatively successful and none has even attempted the solution in the straightforward manner of this invention, in which by the normal use of one manual gain control it automatically is insured that for any strength of antenna signal the first operative tube receives only a very small signal and that this tube operates on a favorable part of its characteristic curve, yet destroying none of the sensitivity of the receiver for weakest received signals. This results in a constant small distortion which will be completely negligible in most applications, and since it is constant it may be completely neutralized by suitable networks.

One purpose of this invention is to minimize and make constant regardless of applied signal strength the distortion originating in the first tubes of a radio receiver.

Another purpose of this invention is, in a Loran receiver, to make the shapes of A and B pips the same regardless of any disparity in the strengths of the A and B received pulses producing the pips.

This invention will be more readily understood from the following detailed description, considered together with the attached drawings, in which.

Figure 1:
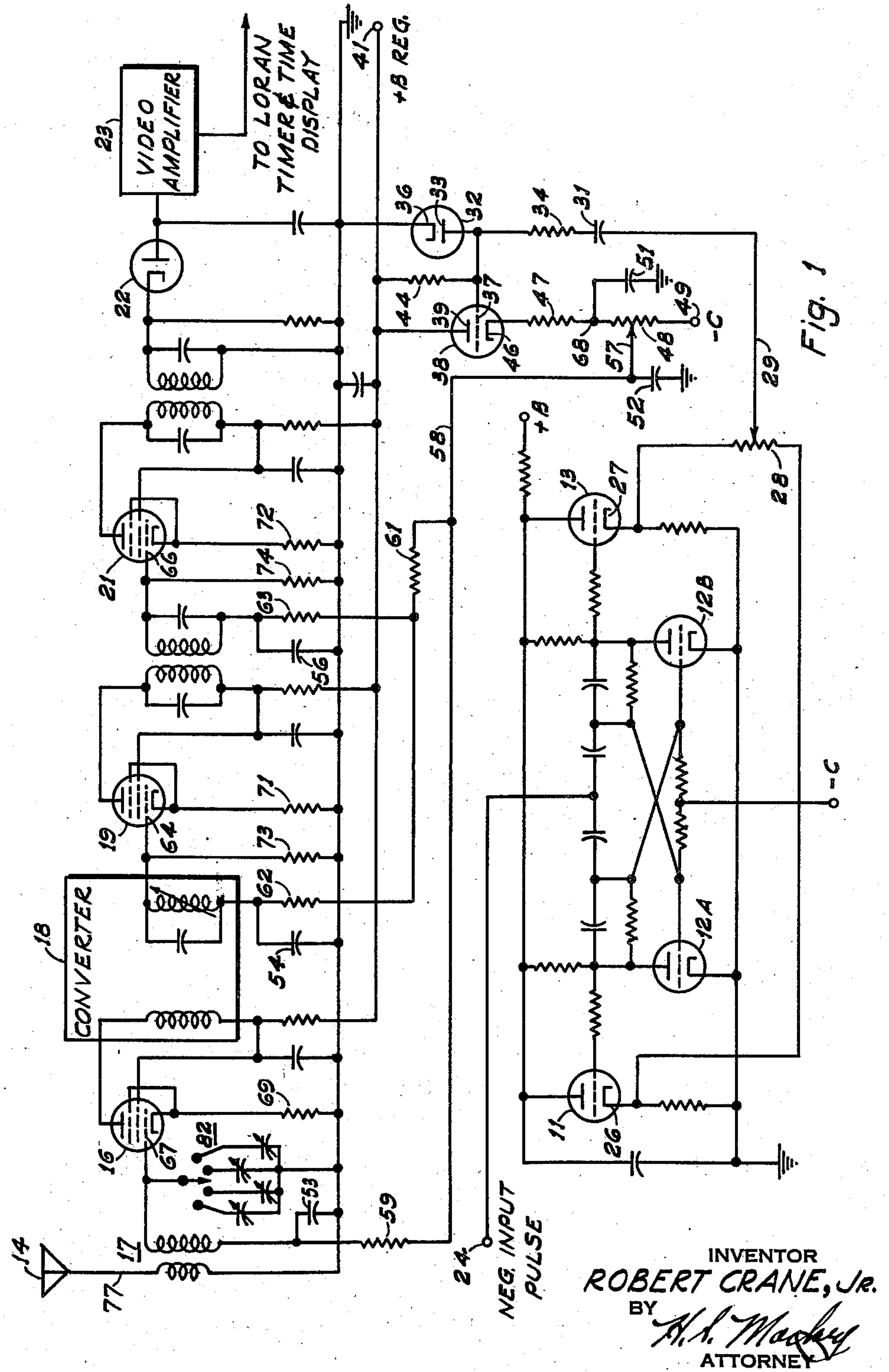
Figure 1 illustrates schematically the wiring of a Loran receiver employing the instant invention.

In Fig. 1 Loran A and B pulses are received on antenna 14, applied to a radio frequency amplifier tube 16 through a transformer 17 tuned by condensers 82, and applied to a converter 18. This converter may include the usual pentagrid tube and an oscillating circuit which, for example, may operate at 3.125 megacycles, so that if channel 1 Loran signals of 1.95 mc. frequency are received, signals of an intermediate frequency of 1.175 mc. will be produced and fed to first intermediate frequency amplifier tube 19, then to second intermediate frequency amplifier tube 21. The output of this tube is transmitted to a detector diode 22, where the signal is demodulated and transmitted through a video amplifier 23 to the Loran timer for utilization in accordance with Loran practice.

Gain control for this Loran receiver is accomplished by the variation of the negative bias applied to tubes 16, 19 and 21, but that of tube 16 is varied in a manner radically different from that of tubes 19 and 21 and this difference constitutes the essence of this invention. Gain control is automatic in the sense that a timed alternation of gain between two values occurs in synchronism with the frequency of alternation of A and B pulses, but the gain control is also manually variable in two ways, first, with respect to the ratio of A pulse gain to B pulse gain, and secondly, with respect to the amount of gain during the reception of the weaker of the two types of pulse.

Figure 12:
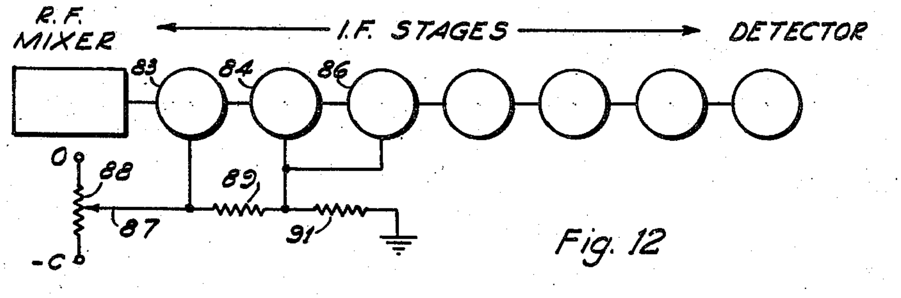
Figures 12 and 13 illustrate modifications of the bias circuit for application to radar receivers.
Figure 13:
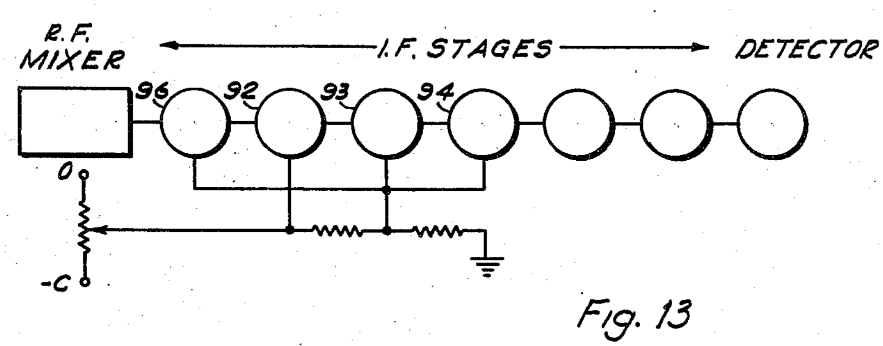

Gain control in an amplitude modulated broadcast receiver would of course, omit the differential gain control and would have an automatic gain control. The application of this invention to such a receiver, however, would otherwise be essentially as described. Gain control in a radar receiver may be applied as indicated in Figs. 12 and 13 and as described hereinafter.

Figures 2, 3, 4, 5, 6, 7, 8:
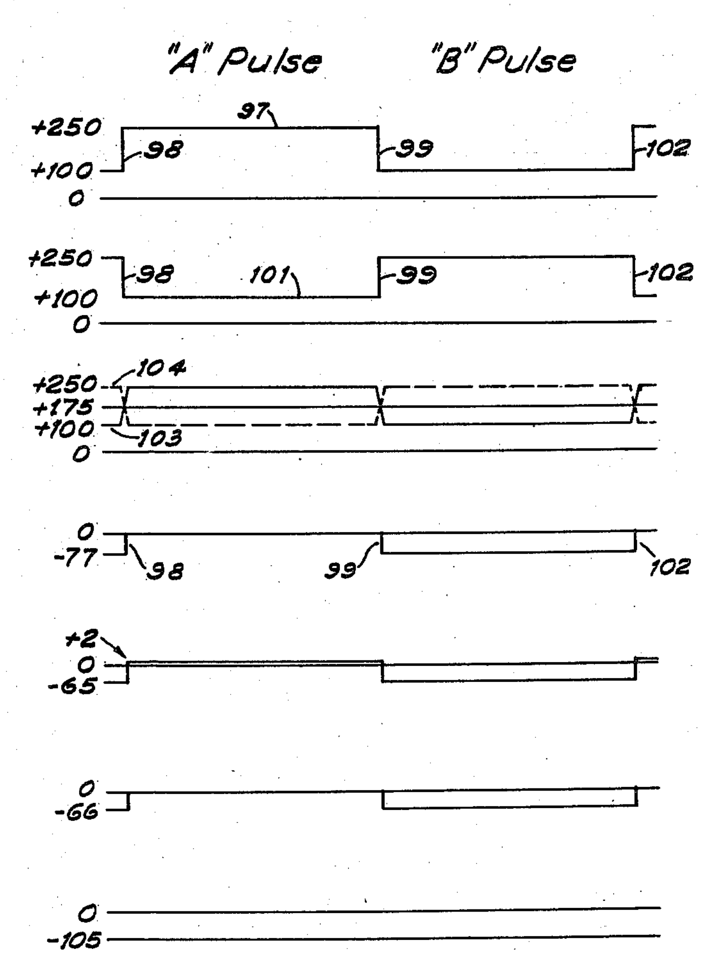
Figures 2 to 8 illustrate graphically the voltage-time relations at various points in the circuit of Fig. 1.

The timing of automatic gain variations in the Loran receiver is achieved by use of the output of the last counter stage of the associated Loran timer, consisting of a scale-of-two multivibrator and output cathode follower tubes. This stage is reproduced in Fig. 1 wherein reference characters 12A and 12B indicate the multivibrator tubes and reference characters 11 and 13 indicate the cathode follower tubes. This timer link is actuated at terminal 24 by the preceding counter stage, the actuation consisting of negative pulses at a frequency, for instance, of 66⅔, 50 or 40 cycles per second, depending on adjustment, and producing alternately from each of the cathode followers 11 and 13 a rectangular positive pulse or half-cycle at a frequency of 33⅓, 25 or 20 cycles per second, succeeded by a half period of like length of less positive voltage output. Components may be so designed that the voltage at the cathode remains at +250 volts for one-half cycle, then remains at +100 volts for the next half-cycle. This is illustrated for the cathode follower tube 11 during one cycle in Fig. 2, wherein potential level 97 exists at the cathode of tube 11 from the beginning of the cycle at time 98 to the half-cycle point at time 99, and lower potential level 101 exists from that time to the end of the cycle at time 102. Fig. 3 represents the simultaneous production of reversed voltages at the cathode of tube 12, level 101 existing between times 98 and 99, and level 97 between times 99 and 102.

Connection are made from the two cathodes, 26 and 27, to the two ends of a high resistance potentiometer 28. This potentiometer therefore during alternate half cycles, has its upper end at a potential of +250 volts, with a constant drop throughout its length to +100 volts at the lower end, and during the remaining half-cycle has a potential of +250 volts at the lower end and +100 volts at the upper end. Slider 29, if in the center, will therefore be at a constant potential of +175 volts, and in any other position will carry potential varying synchronously with the counter stage output variation between two values above and below +175 volts by not more than 75 volts. Fig 4 shows by a solid line 103 the cyclical variation of potential on the lower end of this differential potentiometer, with the variation on the upper end shown by a dashed line 104.

Condenser 31 translates this direct current alternation to an alternating current, removing the 175-volt direct current component and leaving a square wave alternating current with an amplitude which may be as great as 75 volts, the amplitude and phase sense depending on the position of slider 29. This alternating voltage is illustrated by Fig. 4 when the +175-volt line is considered to be the zero line.

Diode 32 clips this voltage so that only the negative half-cycles remain. Its plate 33 is connected through resistor 34 to the output side of condenser 31, and its cathode 36 is grounded. Positive half-cycles therefore pass through this diode to ground, but negative half-cycles charge grid 37 of triode 38 negatively.

Tube 38 is an impedance transformer. It has a high input impedance to ground for the negative signals such as described above and in conjunction with resistor 34 presents such a high impedance to the output of the last counter stage as to impose practically no drain whatever upon it. The plate 39 is connected to a regulated source of about plus 85 volts at terminal 41.

Resistor 44 establishes the direct current bias of diode 32 at approximately zero volts, neutralizing the contact or diode potential thereof.

Cathode 46 of triode 38 is connected through low resistance resistor 47 and high resistance gain control potentiometer 48 to a source of negative potential, which may be −105 volts, at terminal 49. Condenser 51, as well as condensers 52, 53, 54 and 56 are for the purpose of filtering out, bypassing and draining off radio-frequency currents and to protect against switching transients, while blocking the paths of direct currents and of 25-cycle alternating currents. A slider 57 connects any desired point of the potentiometer 48 through lead 58 with the grid return leads of tubes 16, 19 and 21, but this is done through a resistance network consisting principally of resistors 61, 73 and 74 so that approximately two-thirteenths of the voltage of slider 57 is applied to grids 64 and 66 of intermediate frequency tubes 19 and 21 respectively, while all of the voltage is effective at grid 67 of radio frequency tube 16.

The voltage of the grid 37 of tube 38 ranges from zero to minus 77 volts. This is depicted at its maximum negative value of 77 volts in Fig. 5 between times 99 and 102, being the case where slider 29 is at the lower end of potentiometer 28. The cathode 46 will nearly follow these values and will vary from +2 to −65 volts under the assumed conditions, as illustrated in Fig. 6. The values of resistors 47 and 48 are so selected that this will result in a variation of potential at terminal 68 at the top of potentiometer 48 from zero to −66 volts as shown in Fig. 7. This figure illustrates the cyclic variations in lead 58 when slider 57 is at the top of potentiometer 48. When the slider 57 is adjusted at the bottom of potentiometer 48 no variation in potential is present and a continuous steady voltage of −105 is impressed on grid 67 of tube 16 as indicated in Fig. 8.

Figure 9:
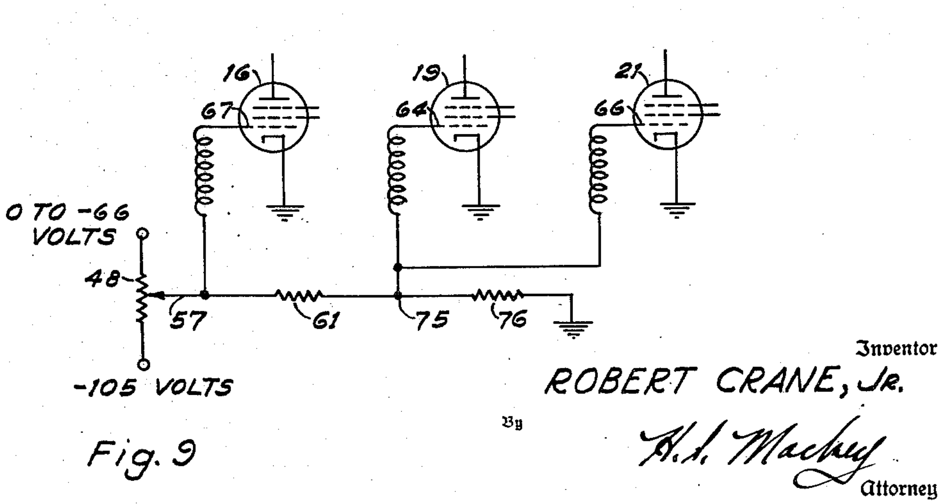
Figure 9 illustrates a bias circuit equivalent to that of Fig. 1.

Fig. 9 illustrates in a more simplified form the grid bias circuit including the potentiometer 48 and the bias supplies for tubes 16, 19 and 21. Resistances 59, 62, 63, 69, 71 and 72 of Fig. 1, although necessary as filters and to prevent zero bias operation, are low in resistance, do not greatly affect the gain control action and hence are omitted for the sake of simplicity. Resistor 76, Fig. 9, represents the parallelled resistances of equal grid leak resistors 73 and 74, which may be approximately 18,000 ohms. Resistor 61 of approximately 1,000,000 ohms and resistor 76 then have the effective voltage of the potentiometer 48 impressed across them in series, the high-voltage terminal being connected to the grid 67 of tube 16 and the $^{2}/_{13}$-voltage terminal 75 between resistors 61 and 76 being connected to the grids 64 and 66 of tubes 19 and 21 in parallel.

When the slider 57 is at the upper end of potentiometer 48, it is at its least negative potential and the receiver is therefore most sensitive. Conversely, when the slider is at the lower end the slider 57 is at its most negative potential and the receiver is least sensitive. The cutoff bias for tube 16 is about −18 volts so that even the strongest or 2-volt antenna input signals, resulting in a 70 volt grid input signal will not operate tube 16 at all when its grid is negative by at least 88 volts assuming a gain for the input net including transformer 17 of 35 times. This will be the case in both halves of the cycle when slider 57 is near the bottom of potentiometer 48, and will be the case even when the slider is near the top if the differential slider 29, Fig. 1, is near either end of potentiometer 28. In such a case the antenna energy will pass tube 16 only by way of the capacities involved, mostly distributed wiring capacity, and will not be amplified but on the contrary will be attenuated. This capacitance serves as a loose coupling between the antenna network 17 and converter 18, and does not distort the radio or pulse frequencies at all. The sensitivity of the receiver is such that the potentiometers 28 and 48 are so set as to permit the bias of tube 16 to rise closer to zero than −18 volts during at least one half-cycle only when the input signal is exceedingly small, so that the excursion of the input along the tube grid-plate characteristics curve is very small and the wave shape of the tube output energy is very like that at the tube grid. Therefore the wave shape of the output voltage of the receiver is independent of the magnitude of the input signal.

Figure 10:
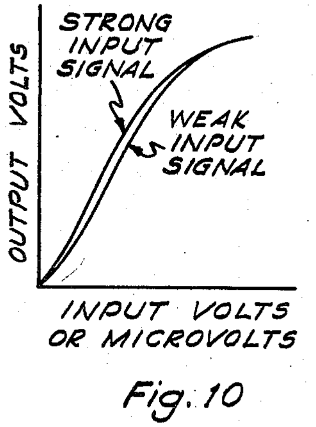
Figure 10 is a graph illustrating the relation between the input and output voltages produced by strong and weak signals.

As an example, let it be assumed that two Loran pulses, A and B are being received and that the strength at the antenna terminal 77, Fig. 1, of pulse A is one volt, while that at the same point of pulse B is one ten-thousandth as strong, or 100 microvolts. The potentiometer slider 29 must then be adjusted near one end, so that during the half-cycle that the strong pulse A is being received, tube 16 has a high negative grid bias of, say, −80 volts, but during the half-cycle that weak pulse B is being received, it has a low negative bias, of say, −12 volts. Since the cutoff point is −18 volts, the tube will not conduct any part of the 1.95 megacycle waves constituting pulse A, but will both conduct and strongly amplify all parts of the weak waves constituting pulse B. It is necessary to adjust this degree of amplification of the B pulses by adjustment of slider 57 so that the amplitude of the electronically amplified B pulses leaving I. F. tube 21 will equal the amplitude of the electrostatically transmitted A pulses leaving that tube. Both pulses will be distorted elsewhere in the receiver but not materially by the tube 16, as is shown by the curves of input as against output derived under test conditions and illustrated in Fig. 10. The departure of these curves from linearity indicates the degree of distortion which pulses may be expected to suffer in passing through the receiver, but the close resemblance in shape between the curve for weak signals and that for strong signals establishes graphically that all of the signals passing through the receiver are distorted in shape in esesntially the same manner regardless of their strength. On the cathode ray tube screen, therefore, the resulting A and B pips will appear to be identical in shape and thus may be easily and accurately matched.

Figure 11:
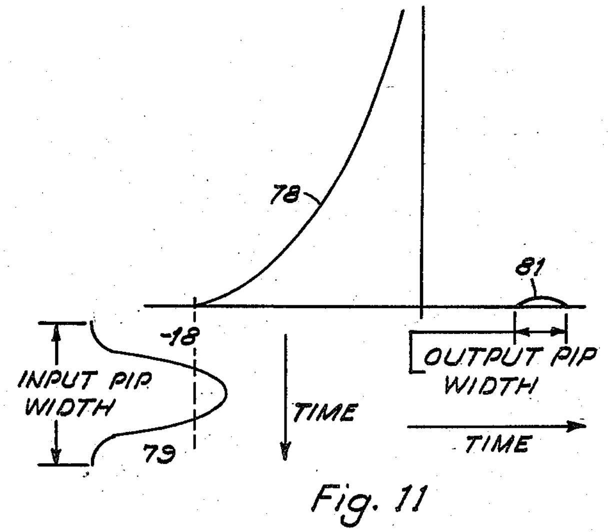
Figure 11 illustrates the manner in which front-end distortion arises.

The manner in which incoming signals may be distorted in receivers not equipped with the bias system of this invention is depicted in Fig. 11, wherein the curve 78 represents the grid voltage plate current relation of the radio frequency tube. If the tube should be biased at about −21 volts and an input pulse with peak voltage of some 7 volts be applied as at curve 79, the output would be represented by curve 81, the shape of which bears little resemblance to that of curve 79.

This type of distortion cannot occur in the equipment of the instant invention. Strong signals are biased so far that not even their positive peaks rise above −18 volts and the tube does not conduct during any part of the radio frequency or pulse frequency cycle. Signals so weak that the bias is between zero and −18 volts have such small amplitude that the curve may be considered nearly a straight line over the amplitude of the signal excursion, so that the tube conducts during all parts of the radio frequency cycle and pulse frequency cycle, and so that the output pulse shape is like the input shape.

The manner in which the bias gain control system of this invention is applied to pulsed microwave receivers of various types is shown in Figs. 12 and 13. In Fig. 12 the invention is illustrated as applied in a narrow band radar receiver to the first three discharge tube stages 83, 84 and 86 of the intermediate frequency amplifier, the stage nearest the antenna, stage 83, being biased by the full negative bias voltage and the next two stages 84 and 86, being biased by approximately $^2/_{13}$ of the bias voltage. This bias voltage adjusted manually by slider 87 on the potentiometer 88, or by any equivalent automatic gain control system, is applied directly to the grid return of stage 83, and a voltage reduced by a voltage dividing network consisting of resistors 89 and 91 is applied to the grid returns of stages 84 and 86. Such a circuit is applicable for reception of very strong signals.

For use in a wide band radar receiver a slightly modified circuit as shown in Fig. 13 is preferred, where the first tube 96 is never biased beyond cutoff and gain control of the invention is applied to the second tube 92 relative to the third and fourth tubes 93 and 94. This is satisfactory for use in reception of weak or medium signals, such signals in ordinary microwave radar reception being of exceedingly small amplitude so that in the absence of this invention any distortion would occur in the second stage and not in the first. Therefore, conventional bias may be applied to the first stage, and is preferred to improve the signal-noise ratio.

In all of the descriptions given of the application of the instant invention the method of gain control consisting of the application of negative voltage to the grid return leads has been employed, and this method is deemed to be preferable. However, other ways of controlling tube bias may be used with the employment of the general method of this invention and the circuits may readily be devised by those skilled in the art. One such alternative method may for example, consist of the variation of positive potentials applied to tube cathodes while keeping the grid return potentials fixed.

What is claimed is:

1. A gain control for a radio receiver having a plurality of amplifying stages in cascade comprising a source of variable bias potential, a voltage divider network connected thereacross, a circuit connecting one terminal of said divider network to a gain control electrode of one of said amplifier stages for impressing the voltage developed across said divider network on said electrode, a circuit connecting an intermediate terminal of said divider network to the gain control electrode of at least one succeeding stage whereby the potential impressed on said succeeding stage is a fraction of that impressed on said first mentioned stage, said variable biasing potential having as a maximum a potential sufficient to operate said first stage well below cutoff so that even high intensity signals are transmitted therethrough only by the capacity coupling of said stage and the divider network being so proportioned that the fractional, potential impressed on the succeeding stage is never below the cutoff bias of said succeeding stage.

2. A gain control in accordance with claim 1 in which said gain control electrodes constitute the control electrodes of said amplifier stages.

3. A gain control for a radio receiver having a plurality of amplifying stages in cascade comprising, a voltage divider network having one terminal connected to a gain control electrode of one of said amplifier stages and an intermediate terminal connected to the gain control electrodes of a plurality of stages succeeding said first mentioned stage, a voltage source connected to said divider network for creating a voltage drop thereacross, manual means for varying the voltage supplied to said divider network by said voltage source over a range of voltage whose maximum is sufficient to operate said first amplifier stage well below cutoff so that even high intensity signals are transmitted therethrough only by the capacity coupling of said stage and said intermediate terminal being located at such a point that the lesser voltage impressed on said succeeding stages is never below the cutoff bias thereof.

4. A gain control for a radio receiver adapted to alternately receive time related pulse signals of different signal strengths, a plurality of amplifier stages therefor, a first source of bias potential, means for cyclically varying said bias potential in timed relation to the reception of said alternate pulse signals, manual means for varying the amplitude of said cyclical variation, a second source of bias potential of fixed value, a potentiometer connected between said first and second bias potential sources, a voltage divider network connected between the movable contact of said potentiometer and the common terminal of said potentiometer and said first source of bias potential, a circuit connecting one terminal of said voltage divider to the gain control electrode of a first amplifier stage, a circuit connecting an intermediate terminal of said voltage divider network to the gain control electrodes of a plurality of amplifier stages succeeding said first amplifier stage, said voltage divider being so proportioned and the range of adjustment of said first bias potential and said potentiometer being such that when adjusted for the reception of all but very weak signals said first amplifier stage is operated below cutoff while said succeeding stages are maintained in their operating range.

5. A gain control for a radio receiver having a plurality of amplifier stages in cascade comprising, a manually operable bias control for varying the bias potential applied to said stages including a potential divider connected to said manually operable bias control and the gain control electrodes of said stages for applying a proportionally lesser bias potential to a plurality of succeeding amplifier stages than to a preceding stage, said manual bias control being operable over a range sufficiently wide so that at its maximum the bias potential applied to said preceding stage cause it to operate well below cutoff and signals are transmitted therethrough solely by the capacitive admittance of said stage and said potential divider being so proportioned that the lesser bias potential impressed on said succeeding amplifier stages is never below the cutoff potential thereof regardless of the variation of said bias control.

6. A gain control according to claim 5 in which said preceding stage is a radio frequency amplifier stage and said succeeding stages are intermediate frequency amplifier stages.

7. A gain control according to claim 5 in which said preceding and succeeding stages are intermediate frequency amplifier stages.

8. A gain control for a radio receiver adapted to alternately receive time related pulse signals of different signal strengths, a plurality of amplifier stages therefor, a first source of bias potential, means for cyclically varying said bias potential in timed relation to the reception of said alternate pulse signals, manual means for varying the amplitude and sense of said cyclical variation, a second source of bias potential of fixed value, a thermionic tube having at least an anode, cathode and control electrode, a circuit impressing said first source of bias potential on said control electrode, a potentiometer connected between said cathode and said second source of bias potential, a voltage divider network connected between the movable contact of said potentiometer and a terminal of fixed potential, a circuit connecting one terminal of said voltage divider network to the gain control electrode of one amplifier stage, a circuit connecting an intermediate terminal of said voltage divider network to the gain control electrodes of a plurality of amplifier stages succeeding said one amplifier stage, the amplitude of said cyclically varying bias potential being varied over such a range of amplitude by said manual means that at maximum amplitude said one amplifier stage is operated well below cutoff and signals are transmitted therethrough only by the capacity coupling of said stage and said voltage divider network being so proportioned that the lesser bias potential applied to said succeeding amplifier stages is never below the cutoff bias thereof.

ROBERT CRANE, Jr.

REFERENCES CITED

The following references are of record in the file of this patent:

UNITED STATES PATENTS

| Number | Name | Date |
|---|---|---|
| 2,129,028 | Roberts | Sept. 6, 1938 |
| 2,459,798 | Dettman | Jan. 25, 1949 |